United States Patent [19]

Kasper et al.

[11] Patent Number: 5,255,768
[45] Date of Patent: Oct. 26, 1993

[54] CORD WINDER APPARATUS FOR A VACUUM CLEANER SYSTEM

[75] Inventors: Gary A. Kasper; Dean R. Rohn, both of Cadillac, Mich.

[73] Assignee: Rexair, Inc., Troy, Mich.

[21] Appl. No.: 986,876

[22] Filed: Dec. 4, 1992

Related U.S. Application Data

[63] Continuation of Ser. No. 766,055, Sep. 26, 1991, abandoned.

[51] Int. Cl.$^5$ .............. H02G 11/02; B65H 75/48
[52] U.S. Cl. .............. 191/12.2 R; 191/12.2 A; 15/DIG. 10; 242/107
[58] Field of Search ........... 15/DIG. 10; 191/12 R, 191/12.2 R, 12.2 A, 12.4; 242/107, 107.6, 107.7

[56] References Cited

U.S. PATENT DOCUMENTS

| | | | |
|---|---|---|---|
| 2,246,862 | 6/1941 | Smellie | 191/12.2 R |
| 2,340,440 | 2/1944 | Swann | 15/DIG. 10 X |
| 2,393,138 | 1/1946 | Borkoski . | |
| 2,487,395 | 11/1949 | Strang | 191/12.2 R |
| 2,532,264 | 11/1950 | Smith . | |
| 2,564,623 | 8/1951 | Harks . | |
| 2,728,182 | 12/1955 | Fulton et al. | 191/12.2 R |
| 2,937,395 | 5/1960 | Meyerhoefer | 191/12.2 R X |
| 2,964,777 | 12/1960 | Allen et al. . | |
| 3,011,033 | 11/1961 | Belicka et al. | 191/12.2 R |
| 3,110,453 | 11/1963 | Becker et al. . | |
| 3,137,883 | 6/1964 | Descarries | 191/12.2 R X |
| 3,275,760 | 9/1966 | Gaudry | 191/12.2 R |
| 3,323,748 | 6/1967 | Cavedo . | |
| 3,339,030 | 8/1967 | Nilsson | 191/12.2 R |
| 3,469,272 | 9/1969 | Gaudry et al. | 191/12.2 R X |
| 3,508,721 | 4/1970 | Gaudry et al. | 191/12.2 R |
| 3,657,491 | 4/1972 | Ryder et al. | 191/12.2 R |
| 3,813,054 | 5/1974 | Klingspor | 191/12.2 R X |
| 4,103,844 | 8/1978 | Deinert et al. . | |
| 4,224,960 | 9/1980 | Nederman . | |
| 4,232,837 | 11/1980 | Cutler et al. . | |
| 4,235,419 | 11/1980 | Schuck . | |
| 4,340,190 | 7/1982 | Zavatkay . | |
| 4,382,563 | 5/1983 | Morita et al. . | |
| 4,402,472 | 9/1983 | Burtscher . | |
| 4,508,288 | 4/1985 | Nilsson . | |
| 4,564,153 | 1/1986 | Morinaga et al. . | |
| 4,565,011 | 1/1986 | Karger . | |
| 4,618,108 | 10/1986 | Butenop et al. . | |
| 4,669,751 | 6/1987 | Unger . | |
| 4,733,832 | 3/1988 | Napierski . | |
| 4,748,746 | 6/1988 | Jacoff . | |
| 4,834,208 | 5/1989 | Kagami et al. . | |
| 4,924,039 | 5/1990 | McAllise et al. | 191/12.2 R |
| 5,023,410 | 6/1991 | Danielson et al. | 191/12.2 R |

FOREIGN PATENT DOCUMENTS 2756023 6/1979 Fed. Rep. of Germany ..... 191/12.2 R Primary Examiner—Michael S. Huppert
Assistant Examiner—Scott L. Lowe
Attorney, Agent, or Firm—Harness, Dickey & Pierce

[57] ABSTRACT

A cord winder apparatus for a vacuum cleaner system. The apparatus generally comprises a generally circular spool upon which a power cord is wound, and a generally circular race over which the spool is coaxially disposed to enable the spool to be rotated thereon as the power cord is unwound and rewound on the spool. The race and spool are further positioned coaxially over a portion of a motor of the vacuum cleaner system to maintain a compact profile of the system. A coil spring is further coupled to the spool to provide a constant retracting force to rotate the spool in a retract direction to rewind the power cord once it has been at least partially unwound from the spool. A brake is further included for releasably maintaining the spool in a desired position once the power cord has been unwound from the spool a desired amount. Power is coupled from the power cord via a pair of continuous conductive strips disposed on an interior wall of the spool and a pair of conductive contacts disposed on a vertical outer sidewall of the race. The contacts are in turn coupled to a motor of the assembly. An optional cord retaining member may be included to facilitate maintaining the power cord upon the spool when the cord is at least partially wound upon the spool.

8 Claims, 5 Drawing Sheets

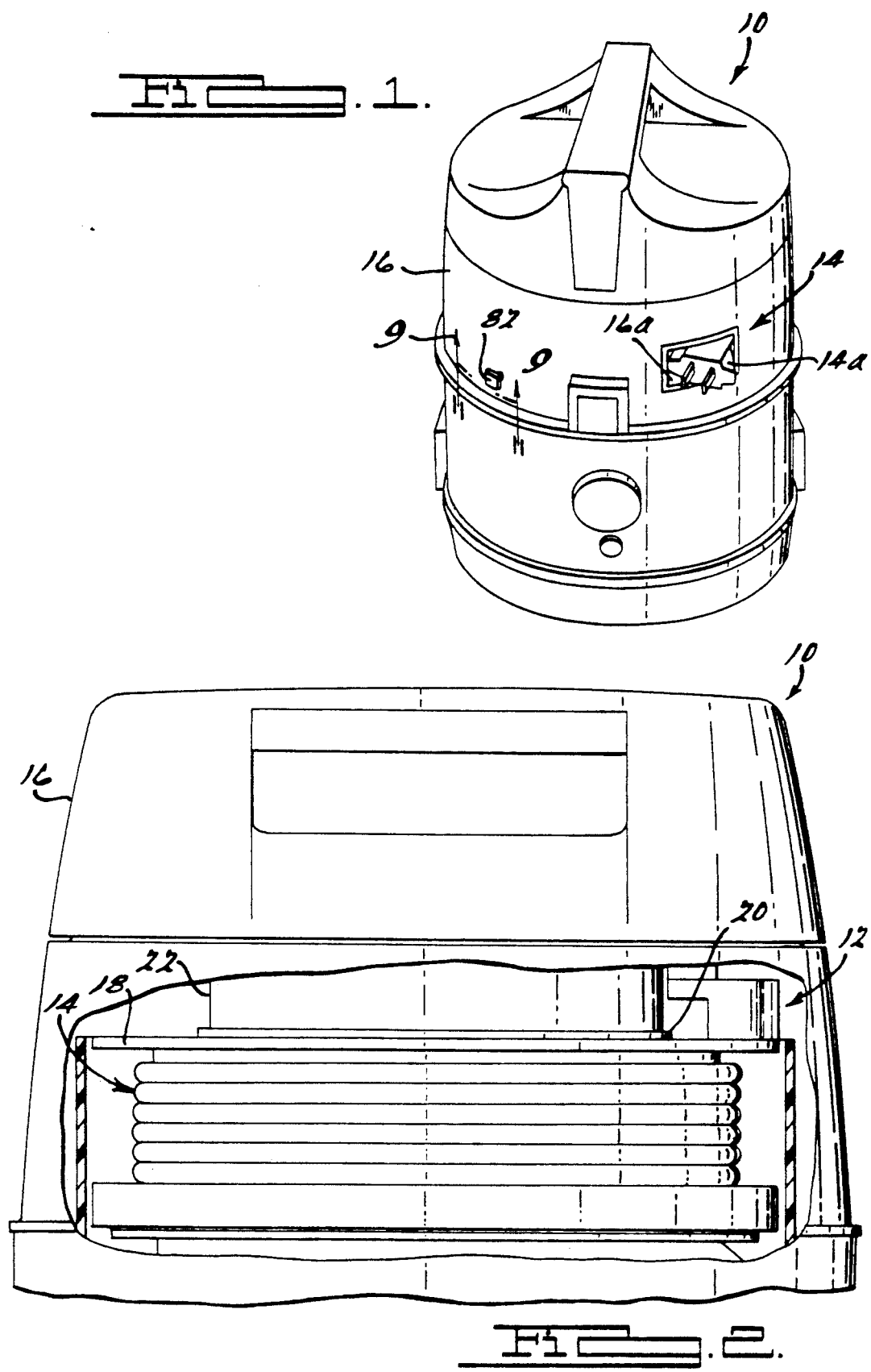

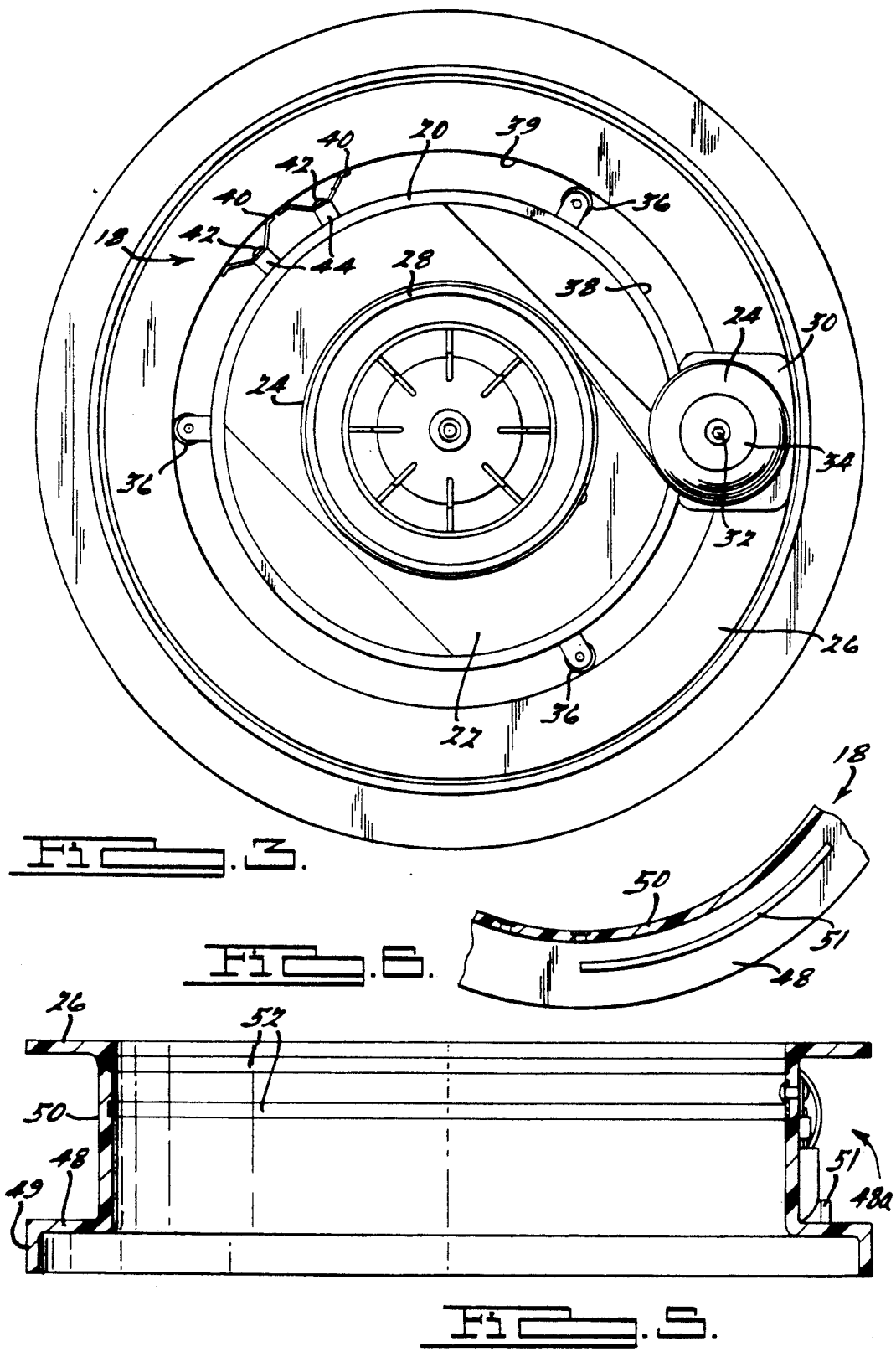

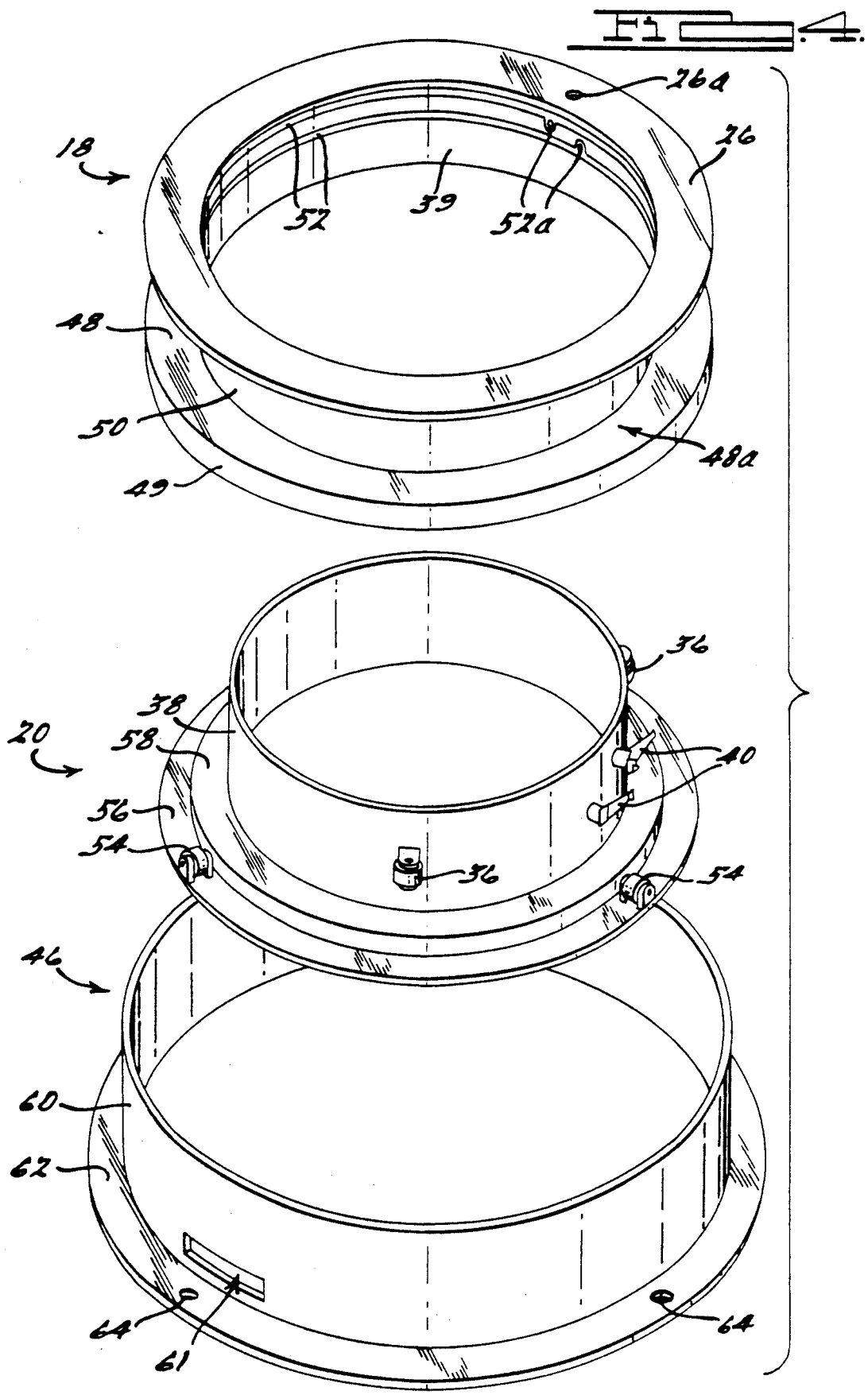

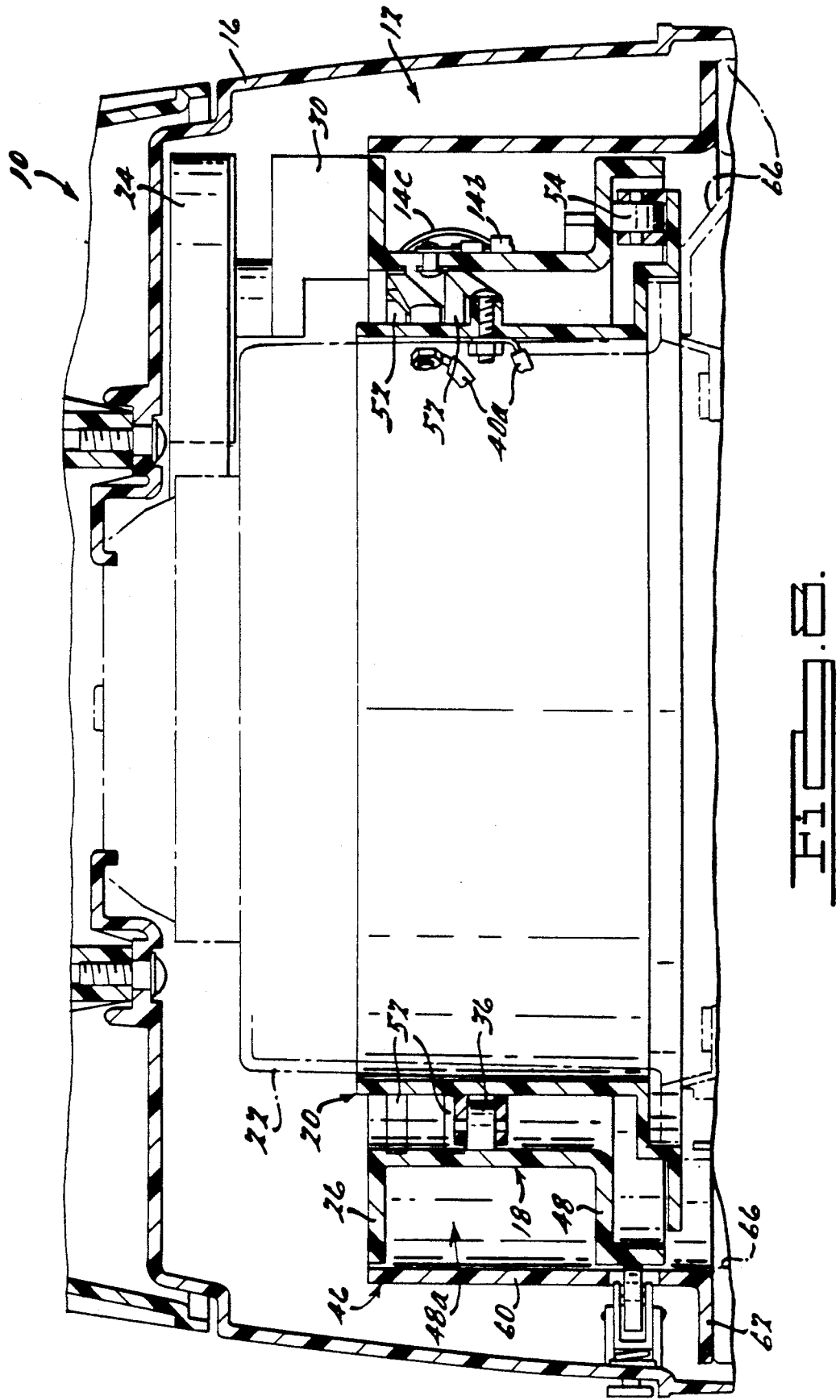

CORD WINDER APPARATUS FOR A VACUUM CLEANER SYSTEM

This is a continuation of U.S. patent application Ser. No. 07/766,055, filed Sep. 26, 1991, entitled "CORD WINDER APPARATUS FOR A VACUUM CLEANER SYSTEM," now abandoned.

BACKGROUND OF THE INVENTION

1. Technical Field

This invention relates generally to vacuum cleaner assemblies and, more particularly, to a vacuum cleaner assembly having an internal cord winder apparatus.

2. Discussion

Vacuum cleaner assemblies are used in a wide variety of applications and environments. Such systems typically are powered by a 120 volt AC power source via an AC plug outlet in the wall of a building, house or other like structure. Accordingly, it is usually necessary to use a power cord which is either fixedly or releasably coupled to the vacuum cleaner assembly to conduct power to the assembly.

When a vacuum cleaner assembly is not in use, the power cord, if it is fixedly secured to the assembly, must typically be wound upon a portion of the assembly or otherwise wound up to prevent it from being damaged or severed from the vacuum cleaner assembly. Thus, it is usually necessary after each use of the vacuum cleaner assembly to wind up the power cord associated therewith and unwind it the next time the assembly is used.

The need to manually wind and unwind the power cord with each use of a vacuum cleaner assembly can detract from the convenience from using the assembly. Where an extra-long power cord is needed, for example, when an area to be cleaned is not closely adjacent a source of power such as an AC wall plug receptacle, an even greater degree of inconvenience may be introduced in using the vacuum cleaner assembly.

A further consideration when dealing with power cords adapted to be used with vacuum cleaner assemblies is the desire and need to maintain the assembly in a relatively compact form. Although cord winders in general are well known in the art, previously developed cord winder assemblies have tended to be somewhat bulky and not well suited for use with vacuum cleaner assemblies. This deficiency is even further apparent when many prior art cord winders are attempted to be integrated into the internal structure of a vacuum cleaner assembly. Since vacuum cleaner assemblies are typically relatively compact devices, previously developed cord winders have proven difficult to incorporate into these assemblies without creating significantly obtrusive protuberances on various body portions of such vacuum cleaner assemblies or significantly altering the shape of the body to an undesirable degree.

Accordingly, it is a principal object of the present invention to provide a cord winder apparatus for a vacuum cleaner system which enables a power cord associated with the assembly to be stored within the assembly when the assembly is not in use and quickly and easily removed therefrom when the assembly is to be used.

It is still another object of the present invention to provide a cord winder apparatus for a vacuum cleaner system which is operable to fit compactly within a body of the vacuum cleaner assembly to thereby avoid producing any aesthetically or functionally unappealing protuberances on an outer body of the vacuum cleaner assembly.

It is yet another object of the present invention to provide a cord winder apparatus for a vacuum cleaner assembly which includes a spool disposed coaxially over at least a portion of a motor of the assembly, where the spool enables a power cord to be wound thereupon and thus housed internally within the assembly when not in use, and quickly, easily and efficiently pulled out (i.e., unwound) when it is desired to use the assembly.

It is yet another object of the present invention to provide a spool for supporting a power cord would thereupon and a race upon which the spool is coaxially disposed, where the race enables the spool to be rotated smoothly and easily when it is desired to wind or unwind the power cord.

It is yet another object of the present invention to provide a cord winder apparatus for a vacuum cleaner assembly which incorporates a spool for supporting a power cord wound thereupon and a brake for releasably maintaining the spool in a desired position after at least a portion of the power cord has been removed from the spool.

It is still another object of the present invention to provide a cord winder apparatus for a vacuum cleaner system which includes a means for transmitting power received from a power cord of the apparatus to a motor of the assembly.

It is still a further object of the present invention to provide a cord winder apparatus for a vacuum cleaner assembly which includes a spool upon which a power cord is wound, where a spring is operably associated with the spool to rotate the spool in a direction operable to wind the power cord thereupon and to maintain the power cord in a fully wound position primarily within the assembly when not in use.

It is yet another object of the present invention to provide a cord winder apparatus for a vacuum cleaner assembly which is quickly, easily and relatively inexpensively constructed from widely available materials, and operable to neatly and compactly house a power cord within the vacuum cleaner assembly when the assembly is not in use.

SUMMARY OF THE INVENTION

The above and other objects are accomplished by a cord winder apparatus in accordance with preferred embodiments of the present invention. The cord winder apparatus generally comprises a spool upon which a power cord is wound, and a race which is disposed coaxially with the spool and which facilitates rotatable movement of the spool. Means are disclosed for coupling electrical power received by the power cord from the spool to a motor of the vacuum cleaner assembly.

In a preferred embodiment of the invention the race and spool are disposed concentrically over at least a portion of the motor of the vacuum cleaner assembly to enable the vacuum cleaner assembly to maintain a compact profile. A spring is further operatively associated with the spool to rotate the spool in a direction operable to retract a power cord coupled thereto when the power cord has been at least partially unwound from the spool. A brake assembly is also included for releasably maintaining the spool in a desired position once at least a portion of the power cord has been unwound from the spool. The brake assembly is manually engageable to permit the spring to rotate the spool in a direction to retract the power cord when the vacuum cleaner assembly is not in use.

In an alternative preferred embodiment of the present invention a cord retaining member is disposed coaxially with at least a portion of the spool to facilitate maintaining a power cord would upon the spool thereon.

The present invention thus provides a cord winder apparatus which fits compactly within a vacuum cleaner assembly without providing any aesthetically or functionally undesirable protuberances on the body of the assembly. The cord winder apparatus is further operable to house a power cord neatly and efficiently within the body of the vacuum cleaner assembly.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective elevational view of a vacuum cleaner system incorporating the cord winder apparatus of the present invention;

FIG. 2 is a cut-away view of a portion of the vacuum cleaner assembly of FIG. 1 illustrating in elevation the spool of the apparatus with a portion of a power cord wound thereon, and in cross-section a portion of a cord retaining member of the invention;

FIG. 3 is a plan view of the cord winder apparatus of the present invention;

FIG. 4 is an exploded perspective view of the spool, race and cord retaining member of the present invention;

FIG. 5 is a side cross-sectional view of the spool of FIG. 4;

FIG. 6 is a fragmentary plan view of the spool of FIG. 5 showing the strain relief member thereof;

FIG. 8 is a side cross-sectional assembly view of the cord winder apparatus of FIG. 2 without the power cord wrapped around the spool;

DETAILED DESCRIPTION OF THE PREFERRED EMBODIMENTS

Figure 7:
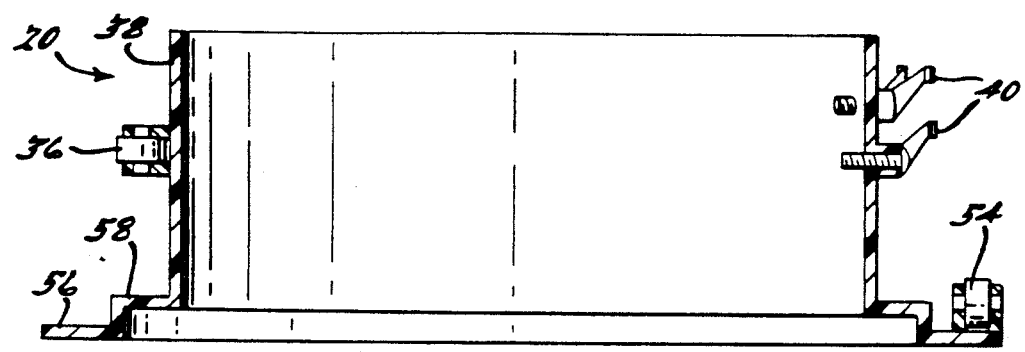
FIG. 7 is a side cross-sectional view of the race of FIG. 4.

Referring to FIGS. 1 and 2, there is shown a vacuum cleaner system 10 incorporating a cord winder apparatus 12 in accordance with the present invention. The cord winder apparatus 12 supports or houses windably thereon the substantial length of a power cord 14 within a removable upper cap member 16 of the vacuum cleaner assembly 10.

The cord winder apparatus 12 generally includes a spool 18 and a race 20 which fits coaxially within the spool 18. Both the race 20 and spool 18 have a generally circular shape and are coaxially disposed over a portion of a motor cover 22 which encloses a motor 22a of the vacuum cleaner assembly 10. Accordingly, the cord winder apparatus 12 of the present invention enables the power cord 14 to be stored within the assembly 10, thereby avoiding the need to wind the power cord 14 around a portion of the exterior of the vacuum cleaner assembly 10 after each use thereof.

Referring specifically to FIGS. 2 and 3, the apparatus 12 further comprises a biasing means in the form of a coil strip spring 24. The spring 24 is secured to an upper flange portion 26 of the spool 18 and also to a vertical sidewall portion 28 of the motor cover 22 preferably via a rivet or other like securing means. The spring 24 is further mounted on a mounting block 30 which is interposed between the spring 24 and the upper flange 26 of the spool 18 to position the spring 24 in elevational alignment with the sidewall portion 28 of the motor cover 22. The spring 24 is secured to the upper flange 26 of the spool 18 preferably via a threaded screw 32 which extends through a central spool 34 upon which spring 24 is wound, through the mounting block 30 and at least a portion of the upper flange 26 of the spool 18. The spring 24 operates to provide a biasing force in a direction operable to continuously urge (i.e., bias) the spool 18 in a retract direction (clockwise as viewed in FIG. 3) to thus automatically retract the power cord 14 when no counter-acting force is acting on the spool 18.

With further reference specifically to FIG. 3, the race 20 is generally circular in shape and includes a plurality of horizontally disposed guide rollers 36 coupled to a vertical outer sidewall portion 38 thereof. The rollers 36 engage an interior wall portion 39 of the spool 18 at three generally equidistant points to thus help maintain the spool 18 aligned generally concentrically with the race 20 and to further facilitate smooth sliding rotation of the spool 18 relative to the race 20.

With further reference to FIG. 3, the race 20 also includes a pair of electrical conductors 40 coupled via screws 42 and bosses 44 to the vertical outer sidewall 38 of the race 20. The conductors 40 function to help couple electrical power received by the power cord 14 (hidden under upper flange 26) to the motor, fan and other electrically-driven components of the vacuum cleaner assembly 10.

In FIG. 4 the spool 18 and the race 20 are shown in perspective, exploded fashion together with a generally circular power cord retaining member 46. With reference to FIGS. 4-6, the spool 18 further includes a lower flange portion 48 having a lower sidewall 49, an intermediate sidewall portion 50, a threaded aperture 26a in the upper flange for receiving threaded screw 32, and strain relief member 51 (FIGS. 5 and 6). The interior wall portion 39 further includes a plurality of conductors in the form of relatively thin, elongated metallic conductor strips fixedly disposed circumferentially and continuously about its entire circumference. Each conductor strip 52 includes an ear portion 52a having an aperture by which independent conductors within the power cord 14 can be electrically coupled. The conductor strips 52 are preferably secured via adhesives or the like although it should be appreciated that other various securing means could be incorporated provided the surfaces of the conductor strips 52 remain generally smooth and relatively free of bumps and other protuberances.

With reference to FIG. 6, the strain relief member 51 is spaced a distance from the intermediate sidewall portion 50 which is slightly less than the outer diameter of the power cord 14. Thus, wedging a portion of the power cord 14 in between the strain relief member 51 and the intermediate sidewall portion 50 provides a strain relief for the power cord 14 to help insure that the power cord 14 is not accidentally uncoupled from the spool 18 during use.

From FIGS. 4 and 7, the race 20 is further shown to comprise a plurality of equally spaced apart horizontal rollers 54 (one being hidden from view on the opposite side of vertical outer sidewall 38) coupled to a lower flange 56. An intermediate shoulder portion 58 is further included to enable the race 20 to rest over a portion of the motor cover 22 when the race 20 is assembled within the vacuum cleaner assembly 10.

As illustrated in FIG. 4, the spool 18 is adapted to fit coaxially and concentrically over the race 20. When assembled, the horizontal rollers 54 contact a lower surface of the lower flange 48 and the vertically disposed guide rollers 36 are disposed closely adjacent the interior wall portion 39 of the spool 18. Accordingly, rollers 36 and 54 enable to spool 18 to rotate smoothly in clockwise and counter-clockwise directions as the power cord 14 (not shown in FIG. 4) attached to the spool 18 is unwound therefrom and rewound thereupon. The upper and lower flanges 26 and 48, respectively, form a channel 48a which enables the power cord 14 (not shown) to be conveniently and compactly housed without interfering with other internal components of the vacuum cleaner assembly 10.

With further reference to FIG. 4, the optional cord retaining member 46 is disposed generally concentrically with the spool 18 and the race 20 when assembled within the vacuum cleaner system 10. The cord retaining member 46 comprises a vertical sidewall portion 60 having a slot 61, and a flange 62. The flange 62 is adapted to be secured via threaded screws or bolts or other like securing means and apertures 64 to a main housing of the vacuum cleaner assembly 10. The sidewall portion 60 is of a vertical length sufficient to substantially cover the channel portion 48a of the spool 18 and helps to insure that the power cord 14 remains confined within the channel 48a even though small amounts of slack may exist in the power cord 14 at various times during which the power cord 14 is in use.

Referring now to FIG. 8, the spool 18, race 20 and cord retaining member 46 are shown in assembly relation with the motor cover 22 and a main frame assembly 66 of the vacuum cleaner system 10. The conductors 40 of the race 20 abuttingly contact the conductor strips 52 in independent fashion when the race 20 is concentrically disposed within the spool 18. The independent conductors 14b and 14c of a terminal end of the power cord 14 are further independently coupled to the ear portions 52a of the conductor strips 52 via electrically conductive threaded screws 14d or the like which extend through apertures in the intermediate sidewall portion 50 to make electrical contact with the conductor strips 52. Thus, power received by the power cord 14 is transmitted through the screws 14a and to the conductor strips 52 where it is received by the conductors 40 of the race 20. The conductors 40 then transmit the electrical power via a pair of conductors 40a to the motor (not shown) and other electrically driven elements of the vacuum cleaner assembly 10. Thus, the arrangement of the conductors 40 enables the continuous transmission of electrical power from the conductor strips 52 as the spool 18 is rotated to any position about the race 20. Accordingly, the power cord 14 need not be completely unwound from the spool 18 to effect coupling of electrical power to the internal, electrically driven components of the vacuum cleanser system 10. Rather, the cord winder apparatus 12 of the present invention enables electrical power to be coupled to the various electrically driven components within the system 10 regardless of whether the power cord 14 is partially or completely unwound from the spool 18.

With further reference to FIG. 8, the cord retaining member 46 is secured to a portion of the main housing 66 via threaded screws (not shown) which extend through apertures 64 in the flange 62 of the cord retaining member 46. The race 20 is similarly secured to a portion of the main housing 66 via a plurality of threaded screws which extend through the apertures 56a. From FIG. 8, it can also be seen how the cord retaining member 46 acts to substantially enclose the channel 48a of the spool 18 to help maintain the power cord 14 within the channel 48a, even though small amounts of slack may periodically exist when unwinding and winding the power cord 14.

Referring now to FIGS. 9-12, a brake assembly 70 of the present invention is shown. With specific reference to FIGS. 9 and 10, the brake assembly 70 is secured to an inner wall portion 72 of the removable upper cover 16 of the vacuum cleaner system 10 via pivot posts 74 and a pivot pin 76. The pivot posts 74 are secured to the inside surface 72 of the removable cover 16 via any conventional means such as adhesives, threaded screws or ultrasonic welding.

The brake assembly 70 comprises a pair of generally Y-shaped frame members 78, a rubber brake wheel 80 and a manually depressible tab member 82. The frame members 78 are clampingly, pivotally secured between the pivot posts 74 to enable pivotal movement of the rubber brake wheel 80 into and out of engagement with the lower sidewall portion 49 of the spool 18. The rubber brake wheel 80 is secured between end of the frame members 78 via a pin 84 to thus hold the rubber brake wheel 80 captively between the frame member 78. Frame member 78 further includes a pair of end portions 78a which each include an elongated slot 86 formed therein. The ends 78a further include portions 78b which angle inwardly slightly. The elongated slots 86 enable the rubber brake wheel 80 to move inwardly and outwardly relative to the pivot post 74, and the angled portions 78b operate to wedgingly lock the rubber brake wheel 80 when the wheel 80 moves laterally within the slats 86 to almost its innermost point of travel relative to the pivot posts 74.

To maintain the frame member 74, and thus the rubber brake wheel 80 in contact with the lower sidewall 49 of the spool 18, a coil spring 88 is interposed between the lower sidewall 49 and the inside surface 72 of the removable cover 16. A boss 90, also affixed to the inside surface 72 and to an end portion of the spring 88, maintains the spring in a generally fixed position relative to the frame members 78. The spring may be secured to the boss 90 by any conventional means such as adhesives.

Figure 9:
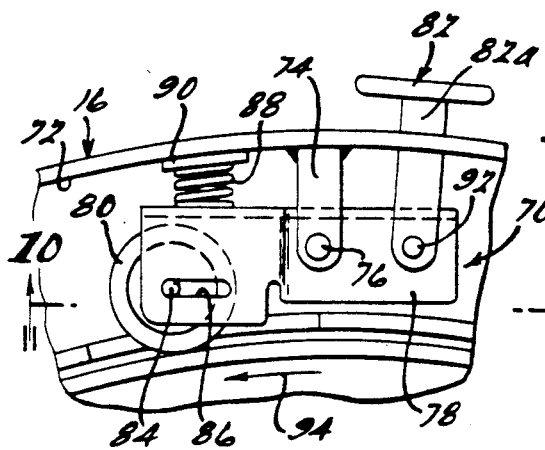
FIG. 9 is a fragmentary plan view of the vacuum cleaner system of FIG. 1 in accordance with section line 9—9 showing the brake assembly thereof in the position it assumes as the spool is being rotated in a direction operable to unwind a power cord housed thereon, as indicated by the directional arrow.
Figure 10:
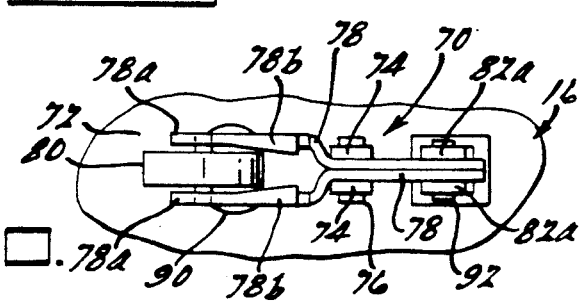
FIG. 10 is an illustration of the brake assembly of FIG. 9 looking radially outward from a sidewall of the spool in accordance with section line 10—10 of FIG. 9.

With further reference to FIGS. 9 and 10, the manually depressible tab member 82 comprises a pair of arms 82a which are pivotally coupled to the frame members 78 via a pivot pin 92. Thus, by depressing the tab member 82 inwardly relative to the cover 16, the rubber brake wheel 80 can be pivotally urged away from and out of contact with the lower sidewall 49 of the spool 18. When pressure is released from the tab member 82, the coil spring 88 biases the rubber brake wheel 80 into contact with the lower sidewall 49 of the spool 18 and maintains the rubber brake wheel 80 in constant contact with the lower sidewall 49.

Figure 11:
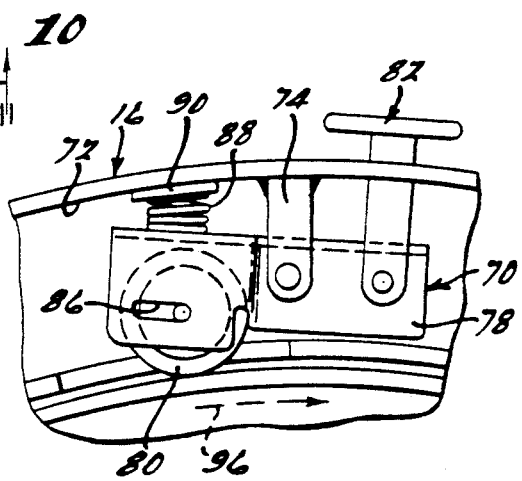
FIG. 11 is an illustration of the brake assembly of FIG. 9 showing the brake wheel thereof becoming wedged to thereby frictionally, temporarily lock the spool in frictional contact therewith as the spool is retracted rotatably by a return spring of the present invention.
Figure 12:
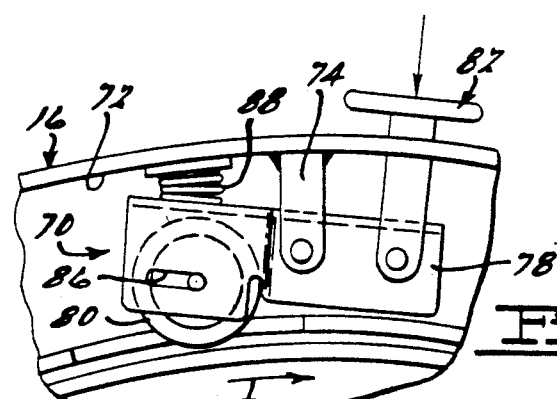
FIG. 12 is an illustration of the brake assembly of FIG. 9 showing how the application of a force to an externally protruding tab member enables the brake wheel to be moved pivotally off of the spool, thereby enabling a retracting spring of the present invention to retractably rotate the spool and power cord associated therewith into an internally stored position.

With reference now to FIGS. 9, 11 and 12, a description of the locking and unlocking action of the brake assembly 70 will be given. Referring first to FIG. 9, as the power cord 14 is unwound from the spool 18 it causes the spool 18 to rotate in the direction of arrow 94. The coil spring 88 biases the rubber brake wheel 80 into constant contact with the lower sidewall 49, which in turn causes the brake wheel 80 to move to and maintain a position at the end of the elongated slots 86 which is farthest, or most outwardly, relative to the pivot post 74. As the spool 18 rotates in the direction of arrow 94, the brake wheel 80 rolls freely along the lower sidewall 49 of the spool 18 without impeding smooth, rotational movement of the spool 18.

Referring now to FIG. 11, after the power cord 14 is unwound to a desired length it is then released. The biasing force provided by the flat coil spring 24 causes the spool 18 to be rotated in an opposite, or retract, direction, as indicated by directional arrow 96. As the spool 18 begins to rotate in the direction of arrow 96, the rubber brake wheel 80 is urged laterally to the opposite ends of the elongated slots 86 closest to the pivot post 74. As the rubber brake wheel 80 is urged within the slots 86 towards the pivot post 74 it becomes wedged (i.e., locked) in a stationary position against the angled portions 78b of the frame member 78. The wedging action, in combination with the biasing force of, coil spring 88, enables the brake wheel 80 to frictionally stop the movement of the spool 18 in the retract direction of arrow 96. Thus, once the power cord 14 is released from its desired position, the flat coil spring 24 is only able to rewind the power cord 14 a very short amount before the rubber brake wheel 80 locks the spool 18 stationary against the biasing force of the flat coil spring 24.

Referring now to FIG. 12, when it is desired to rewind the power cord 14, the tab member 82 is manually depressed with a thumb or a finger. Depressing the tab member 82 moves the rubber brake wheel 80 away from the lower sidewall 49 of the spool 18, thus unlocking the spool 18. This enables the tensioning force applied by the flat coil spring 24 to rotate the spool 18 in the retract direction of directional arrow 96. The rotation of the spool 18 in the retract direction of arrow 96 causes the power cord 14 to be rewound thereupon until portions of the plug 14a abut the walls of the recessed opening 16a, thus preventing the plug 14a from being wound upon the spool 18.

When the optional cord retaining member 46 is included, the slot 61 therein enables the rubber brake wheel 80 to extend into contact with the lower sidewall 49 of the spool 18. When it is desired to remove the upper cover 16, the tab member 82 is depressed inwardly relative to the cover to move the rubber brake wheel 80 out of the slot 61 of the cord retaining member 46. The cover 16 can then be lifted upwardly off of the remainder of the vacuum cleaner assembly 10 if needed. The spool 18, race 20 and cord retaining member 46 are preferably constructed from plastic by conventional construction techniques such as injection molding and/or spin welding individual pieces of each component 18, 20 or 46 to form single, integrally formed components.

The cord winder apparatus 12 of the present invention thus provides a means by which a power cord can be quickly, easily and efficiently unwound and rewound and housed within a vacuum cleaner assembly when not in use. Accordingly, the inconvenience of having to manually wind and unwind a power cord from a body portion of a vacuum cleaner assembly when the vacuum cleaner assembly is desired to be used is obviated. The invention further maintains the compact and aesthetically clean profile of the vacuum cleaner assembly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vacuum cleaner apparatus comprising:

a motor;

generally circular spool means positionable over said motor for enabling a power cord to be woundably retained thereon said spool means having a central opening so as not to cover said motor when positioned over said motor, said spool means including a generally vertical wall portion having first means for transmitting power from said power cord;

generally circular race means operable to fit coaxially at least partially within said spool means for enabling said spool means to rotate thereon, to thereby enable a power cord wound upon said spool means to be unwound therefrom and rewound thereupon, said race means further having a generally horizontal flange portion and a central opening so as not to cover said motor, said race means further having second means operably associated with a generally vertical sidewall portion thereof for receiving power transmitted from said first means and transmitting said received power to said motor;

cover means for enclosing said spool means, said cover means having an opening in a portion thereof;

brake means for holding said spool means stationary after said power cord has been unwound a desired amount from said spool means, said brake means including a brake wheel laterally moveable into a first position in response to movement of said spool means in a first direction, wherein in said first position said brake wheel allows said spool means to rotate freely, and laterally movable into a second position when said spool means is initially rotated in a second direction to frictionally engage said spool means, to thus stop rotation of said spool means and to hold said spool means stationary; and manually engageable brake release means protruding through said opening in said cover means for urging said brake wheel out of said frictional engagement with said spool means.

2. The apparatus of claim 1, further comprising a generally circular power cord retaining member adapted to at least partially circumscribe said spool means to help retain said power cord upon said spool means.

3. The apparatus of claim 1, wherein said race means includes at least one vertically disposed roller adapted to rotate freely, said vertically disposed roller being further adapted to engage an internal wall portion of said spool means to further facilitate rotational movement of said spool means when said power cord associated therewith is unwound therefrom and wound thereupon.

4. The apparatus of claim 1, further including means for biasing said spool means in a direction operable to cause said power cord to be retracted thereunto when said power cord is at least partially unwound from said spool means.

5. The apparatus of claim 4, wherein said brake means further comprises:
   a frame member pivotally coupled to an inside of said cover means for rotatably supporting said brake wheel;
   a spring for biasing said frame member toward said spool means to thereby urge said brake wheel into engagement with an interior wall portion of said spool means; and
   wherein said brake release means includes a tab member pivotally coupled to said frame member and extending through said opening in said cover member for enabling a user of said vacuum cleaner assembly to pivotally urge said brake wheel radially away from said spool means, to thereby enable said biasing means to rotate said spool means in a direction operable to retract said power cord when said power cord is at least partially unwound from said spool means.

6. The apparatus of claim 1, wherein said first means for transmitting power from said power cord comprises:
   a plurality of strips of conductive material extending circumferentially about said generally vertical wall portion of said spool means; and
   said second means for receiving power transmitted from said first means comprises a plurality of electrical contacts fixedly secured to said generally vertical sidewall portion of said race means, said contacts being operable to abuttingly contact said strips to thereby receive electrical power from said power cord.

7. A vacuum cleaner apparatus comprising:
   a motor;
   a generally circular spool positionable over said motor and adapted to windably support a power cord thereon, said spool having a central opening so as not to cover said motor when positioned over said motor;
   a generally circular race adapted to coaxially receive at least partially thereover said spool, said race including a sidewall portion and a generally horizontal flange portion having a first plurality of rollers mounted thereon to support said spool thereon and permit rotation of said spool relative to said race;
   a second plurality of rollers disposed on said sidewall portion of said race to further help maintain said spool concentrically aligned with said race;
   said race and said spool further being disposed over at least a portion of said motor of said vacuum cleaner such that said motor is circumscribed by at least a portion of said sidewall portion of said race, said race further having a central opening so as not to cover said motor;
   a cover member adapted to be removably secured over said spool so as to encapsulate said spool, said race and said motor therein, said cover member having an opening therein;
   power coupling means for coupling power received from a power cord windably disposed upon said spool to said motor;
   a spring for biasing said spool for rotational movement in a first direction operable to retract said power cord when said power cord has been at least partially unwound from said spool and maintaining said power cord in a fully wound position upon said spool; and
   a brake operatively coupled to an inner surface of said cover member for holding said spool stationary when said power cord has been at least partially unwound from said spool, said brake having an actuating member protruding through said opening to allow a user to manually disengage said brake to enable said spring to rotate said spool in said retract direction, to thereby enable said power cord to be automatically retracted when said vacuum cleaner assembly is not in use; and
   said brake including a laterally movable brake wheel movable into a first position in response to movement of said spool in said first direction to frictionally engage said spool to thereby lock said spool stationary, said brake wheel further being movable into a second position of non-locking engagement with said spool in response to movement of said spool in a second direction as said power cord is unwound from said spool, said brake wheel further being liftable away from said spool, to thereby initiate retracting of said power cord in response to engagement of said actuating member by said user.

8. The apparatus of claim 7, further comprising a generally circular power cord retaining member adapted to fit coaxially over at least a portion of said spool to facilitate maintaining said power cord upon said spool.

* * * * *